US008616352B2

(12) United States Patent
Hinouchi

(10) Patent No.: US 8,616,352 B2
(45) Date of Patent: Dec. 31, 2013

(54) HEIGHT ADJUSTABLE SUSPENSION UNIT

(75) Inventor: Hideyuki Hinouchi, Hyogo (JP)

(73) Assignee: ACC, Inc. (JP)

(*) Notice: Subject to any disclaimer, the term of this patent is extended or adjusted under 35 U.S.C. 154(b) by 226 days.

(21) Appl. No.: 13/129,086

(22) PCT Filed: Nov. 17, 2009

(86) PCT No.: PCT/JP2009/069497
§ 371 (c)(1),
(2), (4) Date: May 12, 2011

(87) PCT Pub. No.: WO2010/058773
PCT Pub. Date: May 27, 2010

(65) Prior Publication Data
US 2011/0221109 A1    Sep. 15, 2011

(30) Foreign Application Priority Data

Nov. 18, 2008 (JP) .................................. 2008-294367

(51) Int. Cl.
*F16F 9/00* (2006.01)
(52) U.S. Cl.
USPC ......... 188/321.11; 267/222; 267/34; 267/175
(58) Field of Classification Search
USPC ............... 188/321.11, 322.19; 267/221–226, 267/64.11, 34, 175, 177, 178
See application file for complete search history.

(56) References Cited

U.S. PATENT DOCUMENTS 5,116,016 A * 5/1992 Nagata .......................... 248/578
6,902,045 B2 * 6/2005 Oliver et al. ............. 188/321.11

FOREIGN PATENT DOCUMENTS

| JP | 85202-1985 | 6/1985 |
| JP | 11-108100 | 4/1999 |
| JP | 2001-301436 | 10/2001 |
| JP | 2004-338490 | 12/2004 |
| JP | 2005-188613 | 7/2005 |
| JP | 2006-64101 | 3/2006 |

OTHER PUBLICATIONS

Translation of International Preliminary Report issued in connection with related PCT/JP2009/069497.

* cited by examiner

*Primary Examiner* — Melanie Torres Williams
(74) *Attorney, Agent, or Firm* — Berliner & Associates

(57) ABSTRACT

Provided is a height adjustable suspension unit that can smoothly lift and lower a vehicle body without the need to supply fluid to a shock absorber. The height adjustable suspension unit includes: a shock absorber S having a cylinder 1 and an extensible rod 2 disposed in the cylinder 1 to be able to advance and retract, the extensible rod 2 having an end portion that is coupled to a chassis X; a coil spring 4 mounted around the extensible rod 2, the coil spring 4 having a lower end supported on a spring base 3 that is attached to the upper end of the cylinder 1; and a lifting and lowering mechanism D including a gear mechanism A that is rotationally driven by a power source, a power conversion section B that converts power transmitted from the gear mechanism A into power to move the cylinder 1 up and down, and a guide section C that guides the up and down movement of the cylinder 1.

6 Claims, 13 Drawing Sheets

PRIOR ART

HEIGHT ADJUSTABLE SUSPENSION UNIT

TECHNICAL FIELD

The present invention relates to a height adjustable suspension unit for use in adjusting height of various types of vehicles.

BACKGROUND ART

In recent years, regulations on vehicle height have been relaxed as more emphasis has been placed on running stability and vehicle design, regardless of the type of vehicle—minivan, sports utility vehicle, and the like. As a result, there has been an increasing number of low-floor vehicles (vehicles with low ground clearance). While the low-floor vehicles have contributed to improving running stability and vehicle design mentioned above, they sometimes require adjustment of height when running onto a sidewalk (stepped portion) or coming down from a sidewalk to a road, for example.

A conventional height adjustable suspension unit, produced in response to the need, is now described with reference to FIG. 12. The conventional height adjustable suspension unit includes: a shock absorber S having a cylinder 50 connected to an axle (not shown) and an extensible rod 51 disposed in the cylinder 50 to be able to advance and retract, the extensible rod 51 having at its end a screw portion 52, which passes through a chassis X and to which a nut N is screwed and fixed; a coil spring 55 mounted around the extensible rod 51, the coil spring 55 having a lower end supported on an annular spring base 56 that is attached to the cylinder 50; a cylinder 60 through which the extensible rod 51 passes in the axial direction, the cylinder 60 being fixed to the chassis X; and a plunger 70 inserted into a fluid pressure chamber 80 of the cylinder 60, the plunger 70 being movable along the extensible rod 51 in the axial direction while being in contact with the coil spring 55.

The cylinder 60 has an annular contact portion 61 that is in contact with the chassis X and with the outer circumferential surface of the extensible rod 51; and a tubular covering portion 62 for covering the plunger 70, the tubular covering portion 62 being suspended from the periphery of the annular contact portion 61. The contact portion 61 has an annular groove 61a in its inner circumferential surface, and a packing P is fitted in the groove 61a to ensure sealing between the contact portion 61 and the extensible rod 51.

The plunger 70 includes: an annular rod-side sliding portion 71 that is slidable along the extensible rod 51; a tubular covering portion 72 for covering the outside of the coil spring 55, the tubular covering portion 72 being suspended from the periphery of the annular rod-side sliding portion 71; an annular cylinder-side sliding portion 73 that is slidable along the inner circumferential surface of a lower end opening 63 of the cylinder 60; and a flange-shaped stopper 74 for regulating upward movement of the cylinder 60 by coming into contact with the opening end surface of the cylinder 60, the stopper 74 being disposed on the outer circumferential surface of the lower end of the cylinder-side sliding portion 73 to project radially outward. The annular rod-side sliding portion 71 of the plunger 70, similarly to the contact portion 61 of the cylinder 60, has an annular groove 71a, and a packing P is fitted in the groove 71a. Thus, the plunger 70 is slidable along the extensible rod 51 while at the same time sufficient sealing is ensured. The cylinder-side sliding portion 73 also has a similar packing P on its outer peripheral surface. Thus, the plunger 70 is slidable along the inner circumferential surface of the cylinder 60 while at the same time sufficient sealing is ensured therebetween.

The fluid pressure chamber 80, through which fluid flows in and out, is formed between the inner surface of the cylinder 60 and the outer surface of the plunger 70. The fluid pressure chamber 80 includes: an annular upper space 80a formed between the contact portion 61 of the cylinder 60 and the rod-side sliding portion 71; and a tubular lateral side space 80b formed between the covering portion 62 of the cylinder 60 and the covering portion 72 of the plunger 70.

The cylinder 60 is provided with an attaching portion for an air valve (not shown), through which air is introduced or discharged to and from the fluid pressure chamber 80, and a certain valve is attached to the air valve attaching portion. An example of an air supply and discharge device for use includes an air tank and a compressor connected to the air tank. Such an air supply and discharge device is mounted on the chassis X to introduce air into a vehicle height adjusting unit from the air tank by the operation of a switch provided in the driver seat.

Supply of air is carried out according to a driver's determination. A driver can adjust vehicle height by appropriately adjusting the amount of air supply, not only when driving on roads of different levels, but also when driving on a rough road with bumps or driving on a flat asphalt paved road.

Described here is a manner in which the conventional height adjustable suspension unit is used. FIG. 12 illustrates a state in which: the fluid pressure chamber 80 has not been supplied with fluid (air); the stopper 74 of the plunger 70 is in contact with the opening end surface of the cylinder 60; and the extensible rod 51 of the cylinder 50 is retained at a low ground clearance position by the elastic force of the coil spring 55.

When height adjustment is needed to run onto a sidewalk (stepped portion), fluid (air) is supplied to the fluid pressure chamber 80 in the state of FIG. 12. Then, the air supplied to the fluid pressure chamber 80 presses the flat end surface of the rod-side sliding portion 71 and the annular flat surface of the cylinder-side sliding portion 73 of the plunger 70, as shown in FIG. 13, thereby pushing the plunger 70 downward. In this process, the coil spring 55 is moved downward with its length unchanged, without being compressed and deformed by the air, and the cylinder 50 is moved downward proportionately with the movement of the plunger 70. As a result, the shock absorber extends out, and the chassis X which has been kept at a low ground clearance position is lifted, so as to allow the vehicle to run over a stepped portion without causing any damage to the chassis X.

As another example of a conventional height adjustable suspension unit, one known suspension unit includes: a drive gear disposed concentrically about an end of a rod attached to a chassis; a tubular male screw mounted concentrically about the rod to mesh with the drive gear; and a tubular female screw that is threadedly engaged with the male screw, the tubular female screw being suspended from a spring receiving member disposed at the upper end of a coil spring.

With this height adjustable suspension unit, when the drive gear is rotated, the male screw starts turning while the female screw remains fixed. Thus, vehicle height can be adjusted by the movement of the male screw toward and away from the female screw.

Prior Art Document

Patent Document

Patent Document 1: Japanese Patent Application Laid-open No. Hei-11-108100

SUMMARY OF THE INVENTION

Problems to be Solved by the Invention

The above example of a conventional height adjustable suspension unit has a problem in that: Due to the load of the chassis X, shocks transmitted from the road surface or vibration of the chassis X, distortion occurs during the advancement and retraction of the shock absorber S (in particular, the extensible rod 51) to form a gap between the outer circumferential surface of the extensible rod 51 and the sealing parts (packings P). This causes air leak, which can lead to trouble in adjusting the lifting and lowering of the chassis X.

The second example of a conventional height adjustable suspension unit has a problem in that: Since the drive gear, the male screw and the female screw each need to be disposed concentrically about the rod, work of centering is necessary, which is troublesome and requires accuracy in machining and fabrication of parts.

In view of the above problems, an object of the present invention is to provide a height adjustable suspension unit that enables smooth adjustment of lifting and lowering of a vehicle body without the need to supply fluid to a shock adsorber.

Means for Solving the Problem

In order to solve the above problems, the present invention provides a height adjustable suspension unit including: a shock absorber S having a cylinder 1 and an extensible rod 2 disposed in the cylinder 1 to be able to advance and retract, the extensible rod 2 having an end portion that is coupled to a chassis X; a coil spring 4 mounted around the extensible rod 2, the coil spring 4 having a lower end supported on a spring base 3 that is attached to the upper end of the cylinder 1; and a lifting and lowering mechanism D including a gear mechanism A that is rotationally driven by a power source, a power conversion section B that converts power transmitted from the gear mechanism A into power to move the cylinder 1 up and down, and a guide section C that guides the up and down movement of the cylinder 1.

Accordingly, the structure of the height adjustable suspension unit can be simplified because the up and down movement of the cylinder 1 is driven by power, thus eliminating the need to secure sealing. In addition, height adjustment can be performed simply and reliably to achieve a desired height because the operation of moving the cylinder up and down requires no fine pressure adjustment as it is effected mechanically. Furthermore, the vertical reciprocal movement (operation of moving the cylinder up and down) can be performed smoothly because the guide section C is provided to guide the up and down movement of the cylinder 1.

During the up and down movement of the cylinder 1, the coil spring 4 is not compressed or deformed and the length of the coil spring 4 is thus kept unchanged. Regarding the power source to supply power to the gear mechanism A, power can be supplied either by an electric motor or manually.

According to the present invention, the gear mechanism A may include: a transmission gear 10, 33, 40 that is rotationally driven by a power source; and a wheel gear 11, 34, 110 that meshes with the transmission gear 10, 33, 40, the wheel gear 11, 34, 110 being mounted to the cylinder 1 at such a location as to provide a stroke length.

This structure ensures that the power to move the cylinder 1 up and down is reliably transmitted by the meshing of the gears, thus eliminating the need for fluid supply.

According to the present invention, it is possible to employ a configuration in which: a projecting portion 44 is mounted at one end of one of shaft portions 41 of the transmission gear 40 to be oriented orthogonal to the one end; a connection portion 41a is provided for connection with a manual operation handle 49; and a presser member 47 is provided for bringing the projecting portion 44 into press-contact with a support 481, which rotatably supports the shaft portions 41, to such an extent as to allow the projecting portion 44 to be released from the press-contact with the support 481 by manual pressing.

In this structure, usually, the projecting portion 44 mounted at one end of the transmission gear 40 is held in press-contact with the support 481 by the presser member 47, and thus, the operation of the transmission gear 40 is disabled. When adjusting vehicle height, the manual operation handle 49 is connected to the connection portion 41a disposed at one end of the transmission gear 40 to press the one end of the transmission gear 40, via the manual operation handle 49, in the direction opposite to the direction in which the projecting portion 44 is brought into press-contact. This allows the projecting portion 44 to be released from press-contact with the support 481, thereby enabling rotational operation of the gear to adjust vehicle height.

According to the present invention, the power conversion section B may include: a female screw 15 fixed to the inner circumferential surface of the wheel gear 11, 34, 110; and a male screw portion 5 that is threadedly engaged with the female screw 15, the male screw portion 5 being formed on the outer circumferential surface of the cylinder 1.

In this structure, the rotation of the gear mechanism A is converted into rectilinear motion by the threaded engagement of the female screw 15 that is fixed to the inner circumferential surface of the wheel gear 11, 34, 110 with the male screw portion 5 that is formed on the outer circumferential surface of the cylinder 1, and thus, the cylinder 1 can be mechanically moved up and down.

According to the present invention, the guide section C may include: rails 26, 26 disposed below the power conversion section B along the axial direction; and a movable part 6 mounted at the lower end of the cylinder 1 to be movable along the rails 26, 26.

In this structure, the movable part 6, which is mounted at the lower end of the cylinder 1, moves along the rails 26, 26. Because of this, the cylinder 1 can move up and down without being affected and hence being rotated by rotational power from the gear mechanism A, even if the rotational power is transmitted to the cylinder 1. In other words, the rotational power of the gear mechanism A in whole is converted into power to move the cylinder 1 up and down, so that the cylinder 1 can be raised and lowered smoothly.

Advantages of the Invention

As discussed above, according to the present invention, the cylinder is mechanically moved up and down by the meshing of gears and the threaded engagement of the female screw and the male screw interlocking with the gears. This eliminates the need for sealing between the cylinder and the extensible rod as conventionally required, while enabling simple and reliable height adjustment to achieve a desirable height without the need to supply fluid. What is more, the length of the spring does not vary with the change in the vehicle height, which results in an advantage of offering a comfortable ride at any time without compromising the ride quality.

DETAILED DESCRIPTION OF THE PREFERRED EMBODIMENTS

Figure 1:
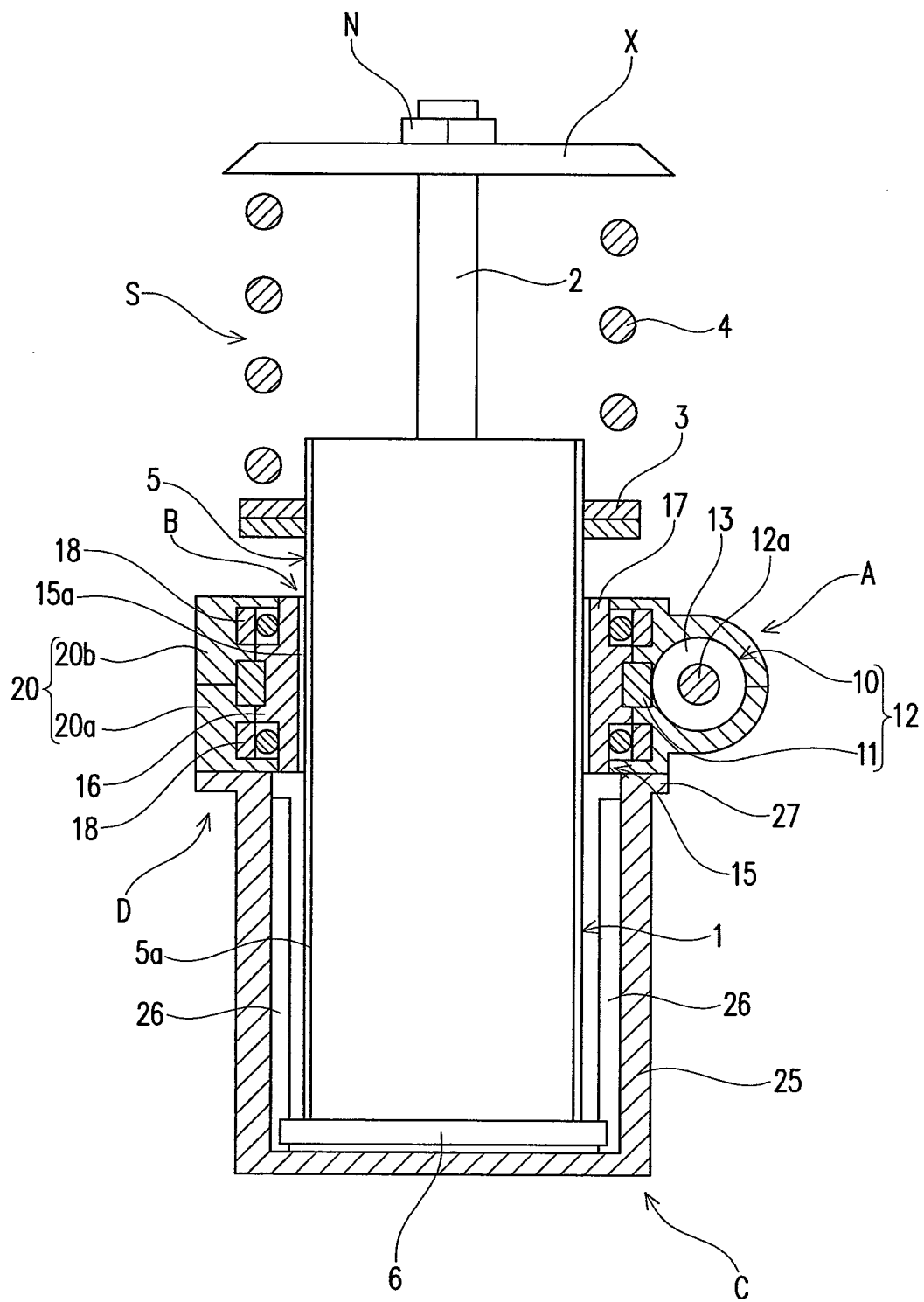
FIG. 1 is a cross sectional view of a height adjustable suspension unit according to the present invention, illustrating a state in which a cylinder is at the lowered position.

The height adjustable suspension unit of the present invention is described below with reference to the accompanying drawings. As a basic structure, the height adjustable suspension unit of the present invention includes: a shock absorber S having a cylinder 1 and an extensible rod 2 that advances and retracts relative to the cylinder 1; and a coil spring 4 mounted around the extensible rod 2 while being supported, at its lower end, on a spring base 3 that is attached to the upper end of the cylinder 1. This basic structure is similar to that of the conventional art, and therefore, a detailed description of these components is omitted.

As shown in FIGS. 1-8, the height adjustable suspension unit of the present invention essentially includes: a gear mechanism A that is rotationally driven by a power source; a power conversion section B that converts power transmitted from the gear mechanism A into power to move the cylinder 1 up and down; and a guide section C that guides the up and down movement of the cylinder 1.

The cylinder 1 has a male screw portion 5 on its outer circumferential surface where a thread groove 5a is formed along the axial direction. The cylinder 1 has a disc shaped movable part 6 fixed at the end surface of its lower end, and the diameter of the movable part 6 is larger than the outer diameter of the cylinder 1. The movable part 6 has recesses 6a, 6a that are recessed radially inward on its peripheries at such positions that they face each other. The recesses 6a, 6a are fitted with the rails 26, 26 of a later-described guide section C to allow the movable part 6 to move along the rails 26, 26 (cf., FIG. 8).

The gear mechanism A includes a worm gear 12 having: a worm 10 that is rotationally driven by a power source, such as an electric motor when the cylinder 1 is moved up and down; and a worm wheel 11 that meshes with the worm 10, the worm wheel 11 being mounted to the cylinder 1 at such a location as to provide a stroke length, i.e., at a substantially middle position of the length of the cylinder 1 (the length between the tip end of the extensible rod and the movable part 6). The worm 10 has shaft portions 12a, 12a projecting from both ends thereof, and the shaft portions 12a, 12a are rotatably supported by bearings 13, 13.

The power conversion section B includes: a female screw 15 fixed to the inner circumferential surface of the worm wheel 11; and a male screw portion 5 formed on the outer circumferential surface of the cylinder 1 to be threadedly engaged with the female screw 15. The female screw 15 includes a tubular portion 16 having a thread 15a on its inner circumferential surface, and the tubular portion 16 has annular shaft portions 17, 17 projecting from both ends thereof in the axial direction. The annular shaft portions 17, 17 have a smaller diameter than the tubular portion 16 and are rotatably supported by bearings 18, 18.

The worm wheel 11 meshes with the worm 10; the shaft portions 12a, 12a of the worm 10 are rotatably supported by the bearings 13, 13; and the female screw 15 is turnably supported by the bearings 18, 18. With this positioning, they are housed in a case 20. The case 20 has a horizontally long cuboid shape, and includes a lower case body 20a and an upper case body 20b. The case 20 is configured such that it can be disassembled and reassembled. Cylinder insertion holes 21 are formed on the bottom side of the lower case body 20a and the top side of the upper case body 20b, at positions close to the left side, and the cylinder 1 is inserted into the insertion holes 21 from below to pass upward. Bolt insertion holes 22 are formed at locations that lie on two extension lines crossing right angle at the center of each of the insertion holes 21. Fitting holes 23, 23 are formed on front and back sides of the case bodies 20a, 20b, in areas close to the right side, and the bearings 13, 13 of the worm 10 are fitted into the fitting holes 23, 23.

The guide section C is located below the power conversion section B. The guide section C includes: a tubular body 25 for housing the cylinder 1 in a fixed state so that the cylinder does not rotate, without being driven by power transmitted from the gear mechanism A (the worm 10 and the worm wheel 11); and a pair of rails 26, 26 fixed to the inner circumferential surface of the tubular body 25 along the axial direction at such positions that they face each other. The tubular body 25 has, on its opening end, a flange 27 having a quadrilateral shape as viewed in plan, and the flange has attachment holes 27a at positions of its corners corresponding to the above-mentioned bolt insertion holes 22 of the lower case body 20a.

Figure 7:
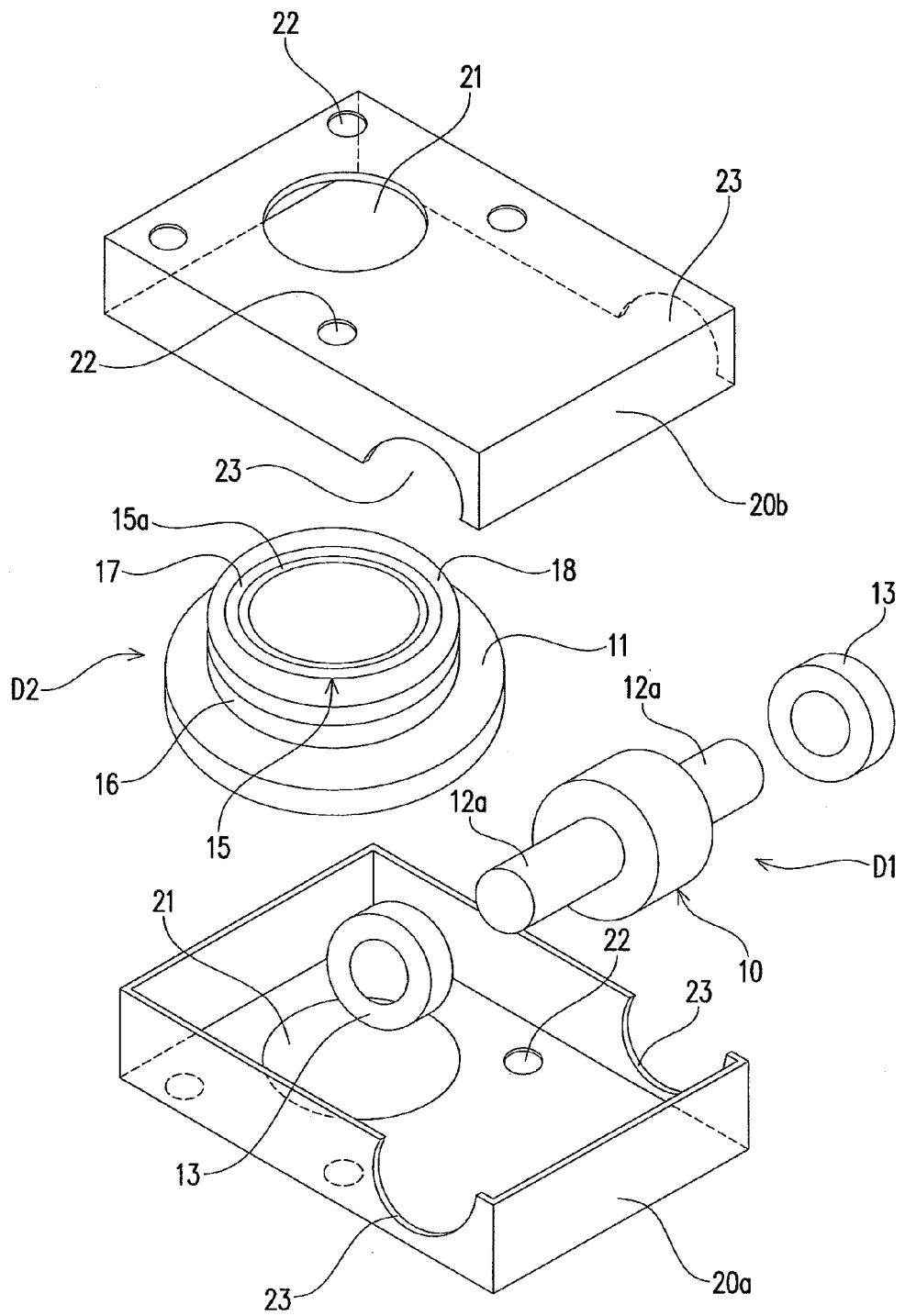
FIG. 7 is an exploded perspective view illustrating a state in which a first assembly of the lifting and lowering mechanism and the second assembly of the lifting and lowering mechanism are incorporated into a case.
Figure 8:
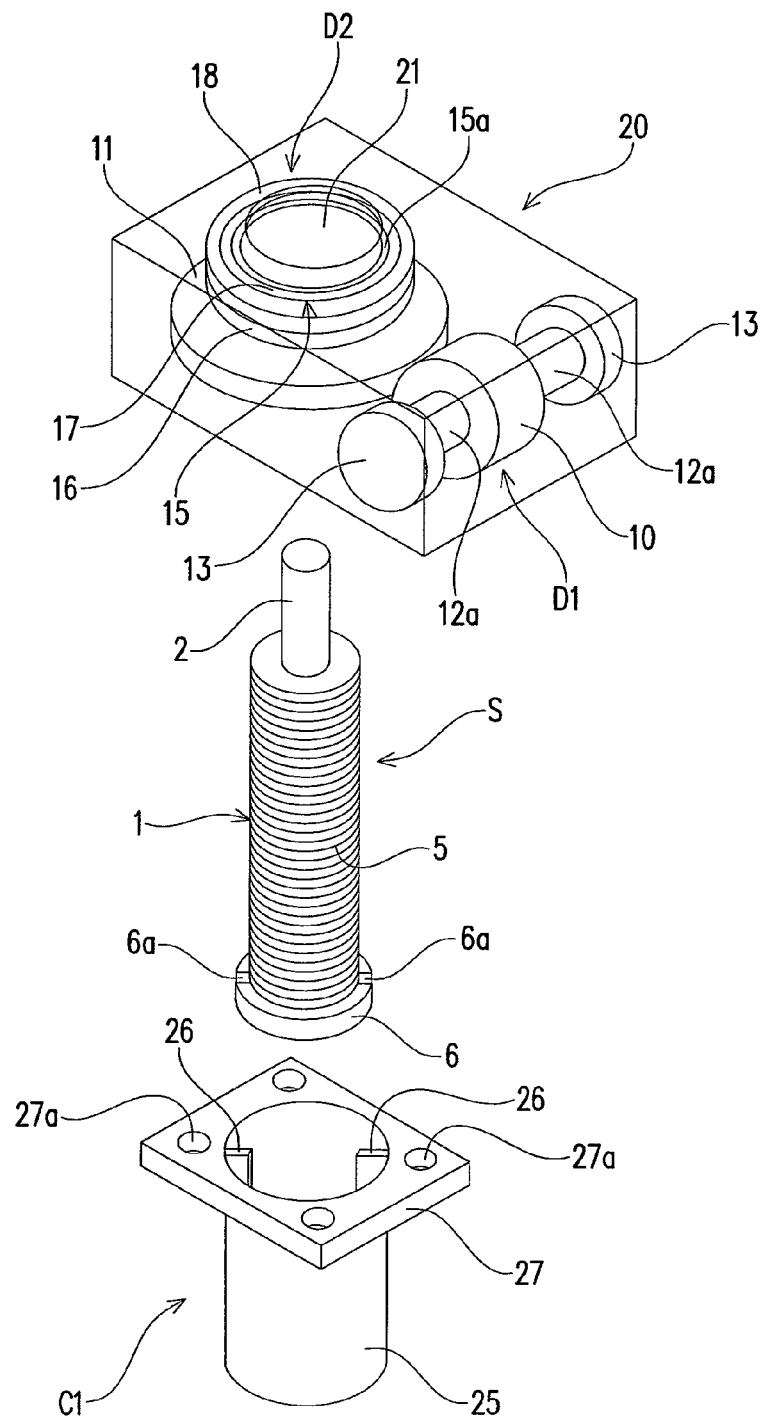
FIG. 8 is an exploded perspective view illustrating how the cylinder and a tubular body of a guide section are attached to the second assembly of the lifting and lowering mechanism.

With reference to FIGS. 7 and 8, described here is the order in which the vehicle height adjusting unit of the present invention is assembled. As shown in FIG. 7, a first assembly D1 of the lifting and lowering mechanism is assembled by providing the shaft portions 12a, 12a of the worm 10 with the bearings 13, 13, and a second assembly D2 of the lifting and lowering mechanism is assembled by providing the annular shaft portions 17, 17 of the female screw 15 fixed to the inner circumferential surface of the worm wheel 11 with bearings 18, 18. In the meantime, as shown in FIG. 8, an assembly C1 of the guide section is assembled. by attaching a pair of rails 26, 26 to the inner circumferential surface of the tubular body 25 along the axial direction at such positions that the rails 26, 26 face each other.

Then, as shown in FIG. 7, the first assembly D1 and the second assembly D2 of the lifting and lowering mechanism are mounted within the lower case body 20a. The bearings 13, 13 of the worm 10 and the bearings 18, 18 of the female screw 15 are temporarily fixed in such a manner that axis lines of the worm 10 and the worm wheel 11 are orthogonal to each other, so as to allow the worm wheel 11 to mesh with the worm 10. Then, the upper case body 20b is placed from above on the lower case body 20a to reliably fix the bearings 13, 13 of the worm 10 and the bearings 18, 18 of the female screw 15.

Subsequently, as shown in FIG. 8, the cylinder 1 is inserted from below the second assembly D2 of the lifting and lowering mechanism to pass through upward. The male screw portion 5 of the cylinder 1 is turned and brought into threaded engagement with the female screw 15, so that the extensible rod 2 extends upward from the upper case body 20a. Then, the turning of the male screw portion 5 of the cylinder 1 is stopped at the middle position of the male screw portion 5 of the cylinder 1, and checking is done to confirm whether a stroke length is provided or not. FIG. 8 illustrates a state in which the first assembly D1 and the second assembly D2 of the lifting and lowering mechanism are housed in the case 20, and thus FIG. 8 schematically illustrates the case 20, not explicitly showing the lower case body 20a and the upper case body 20b.

After confirming that there is a stroke length, the rails 26, 26 of the tubular body 25 are fitted into the recesses 6a, 6a of the movable part 6 of the cylinder 1 from below. Then, the tubular body 25 is raised in this state so that the flange 27 of the tubular body 25 is brought into contact with the bottom surface of the lower case body 20a, and the tubular body 25 is fastened and fixed to the lower case body 20a with bolts and nuts (not shown), thereby completing the assembly as shown in FIG. 1.

Figure 2:
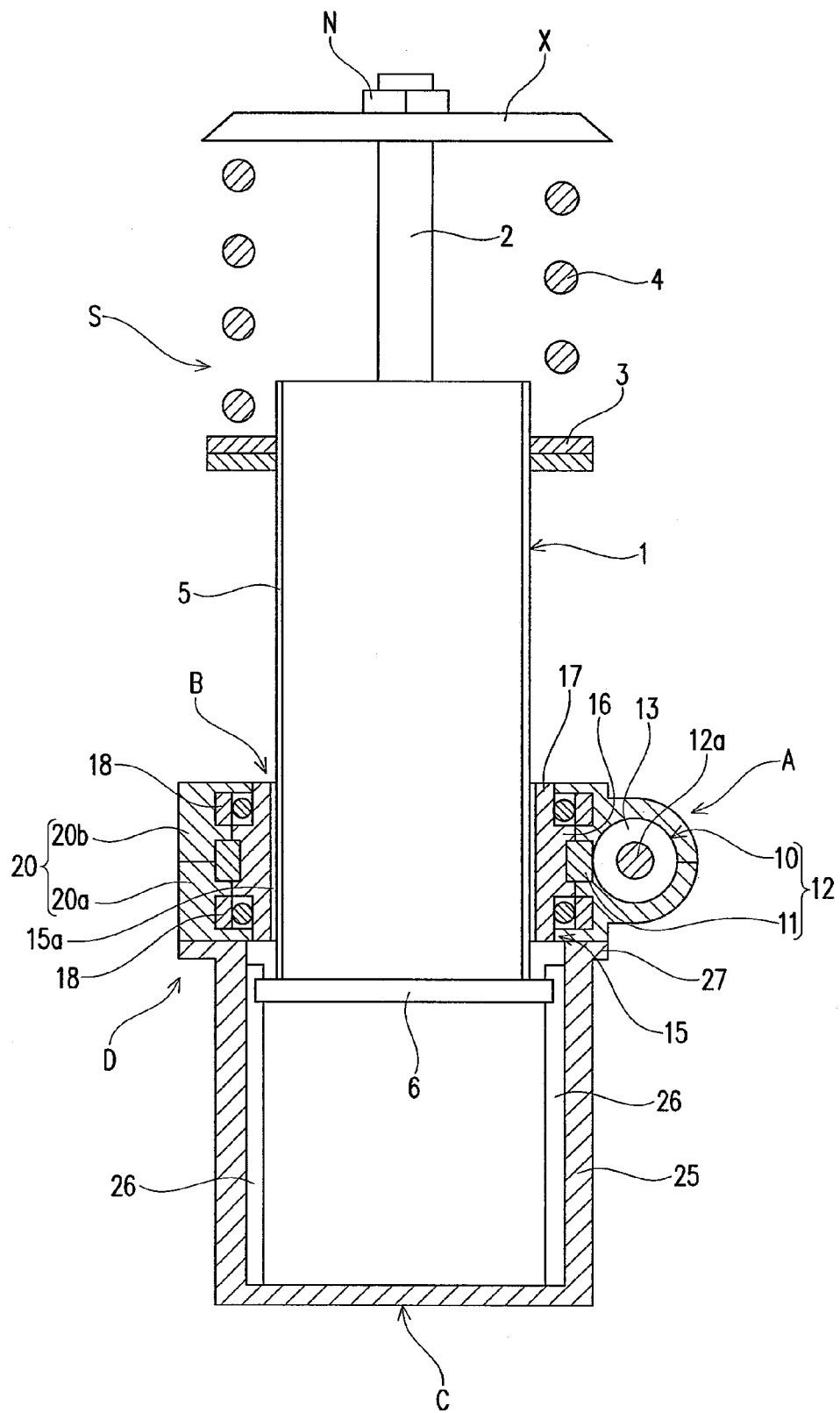
FIG. 2 is a cross sectional view, illustrating a state in which the cylinder has been raised.
Figure 3:
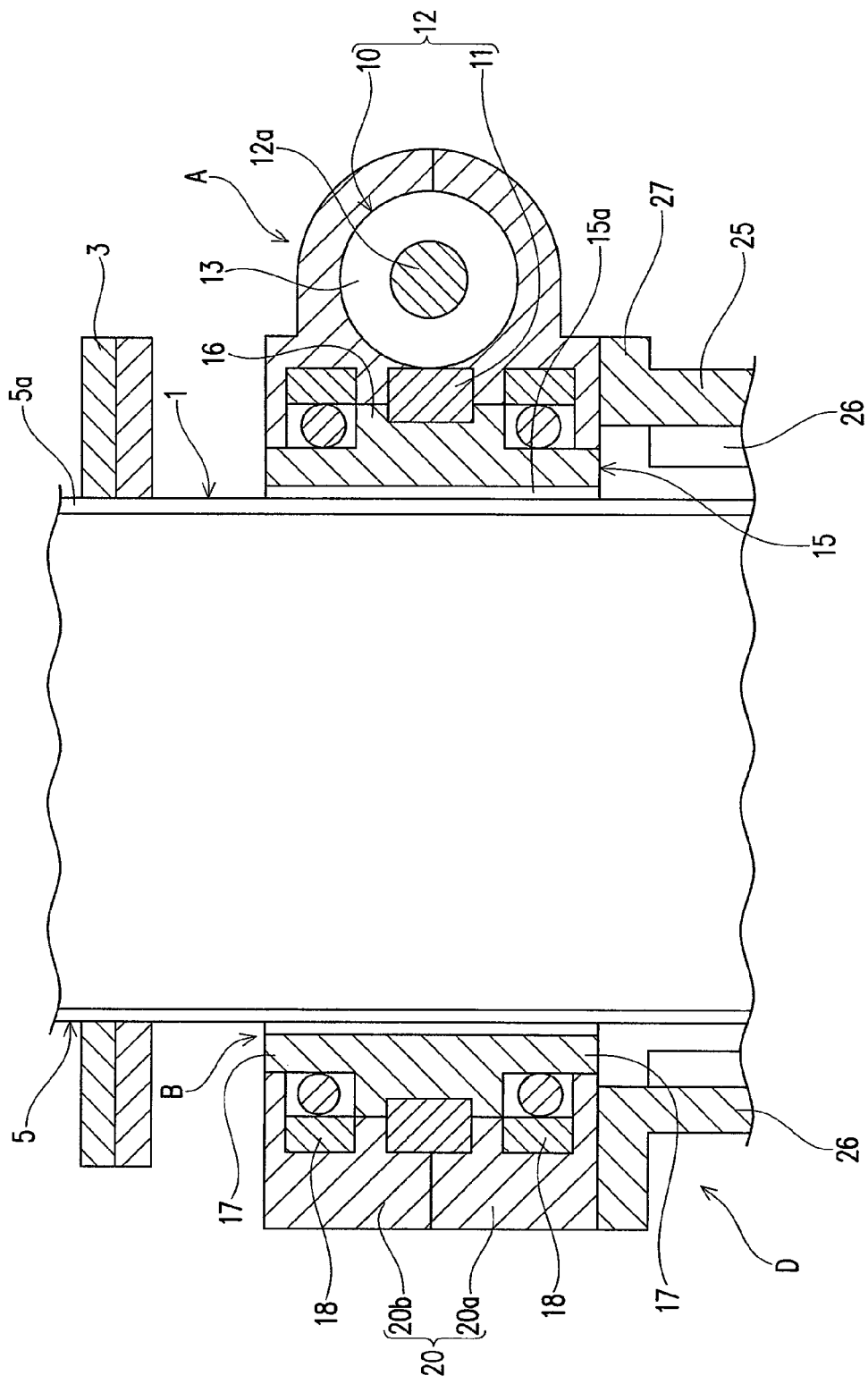
FIG. 3 is an enlarged view illustrating a lifting and lowering mechanism of FIG. 1.
Figure 4:
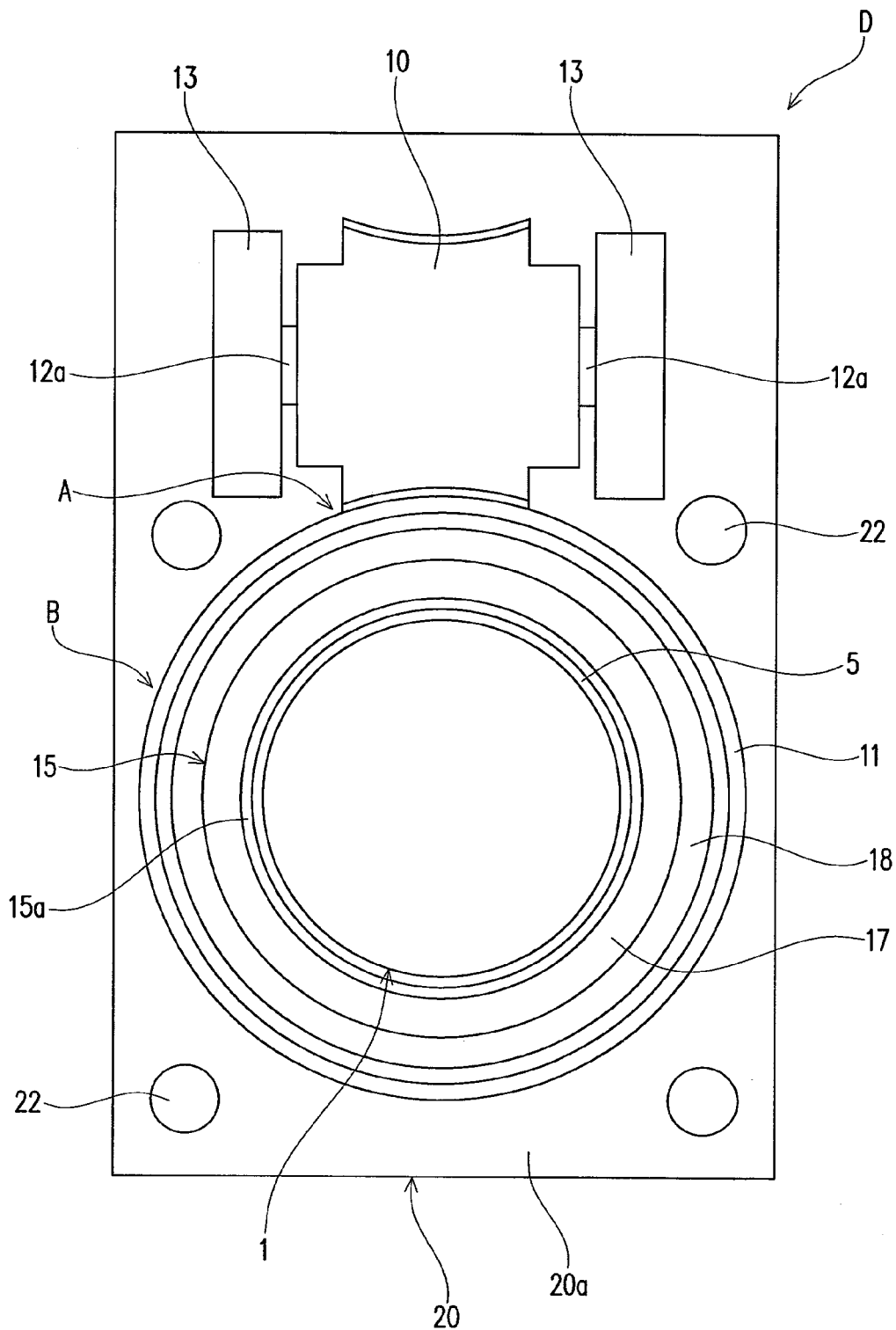
FIG. 4 is a plan view of FIG. 3.
Figure 5:
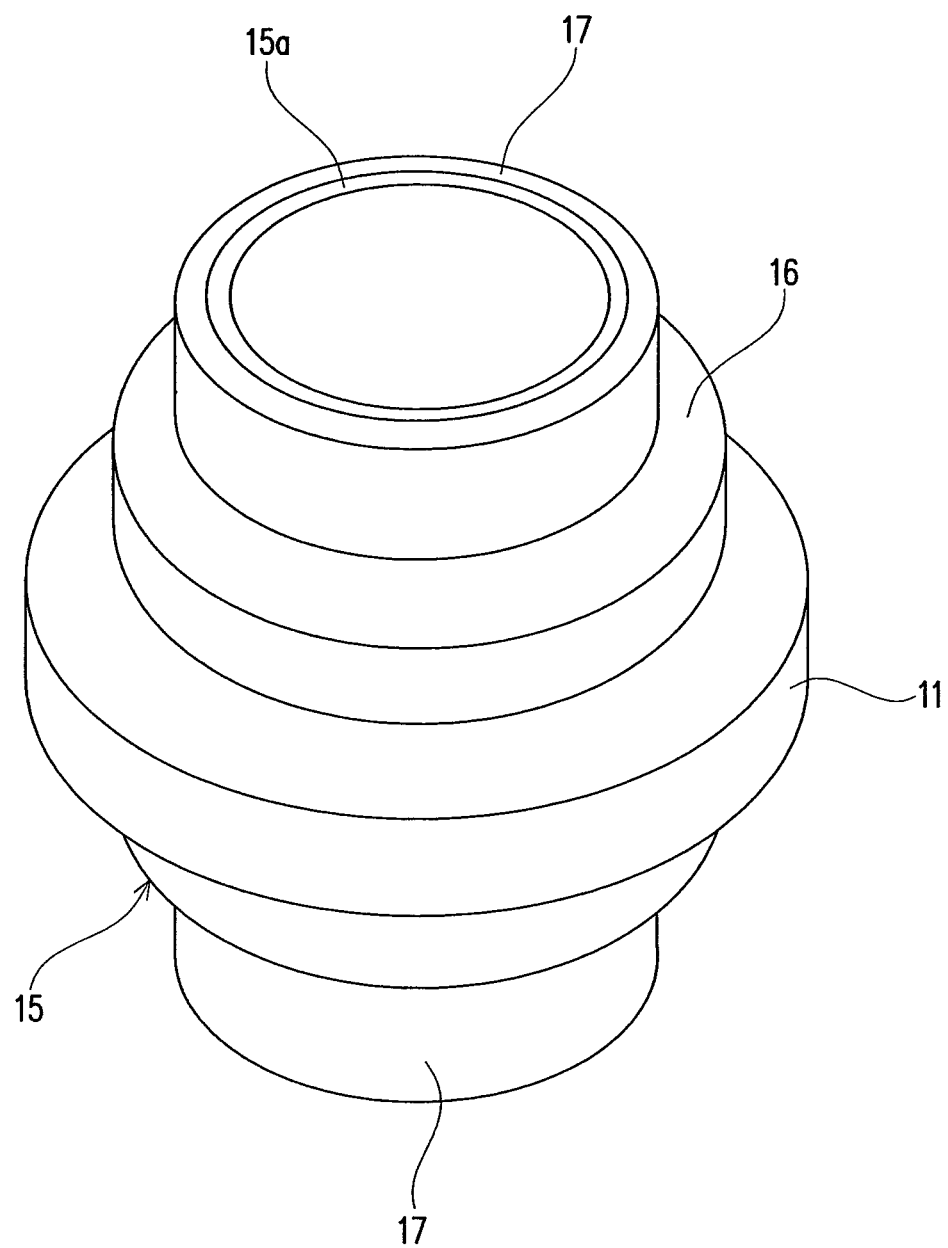
FIG. 5 is a perspective view of a worm wheel with a female screw fixed to its inner circumferential surface.
Figure 6:
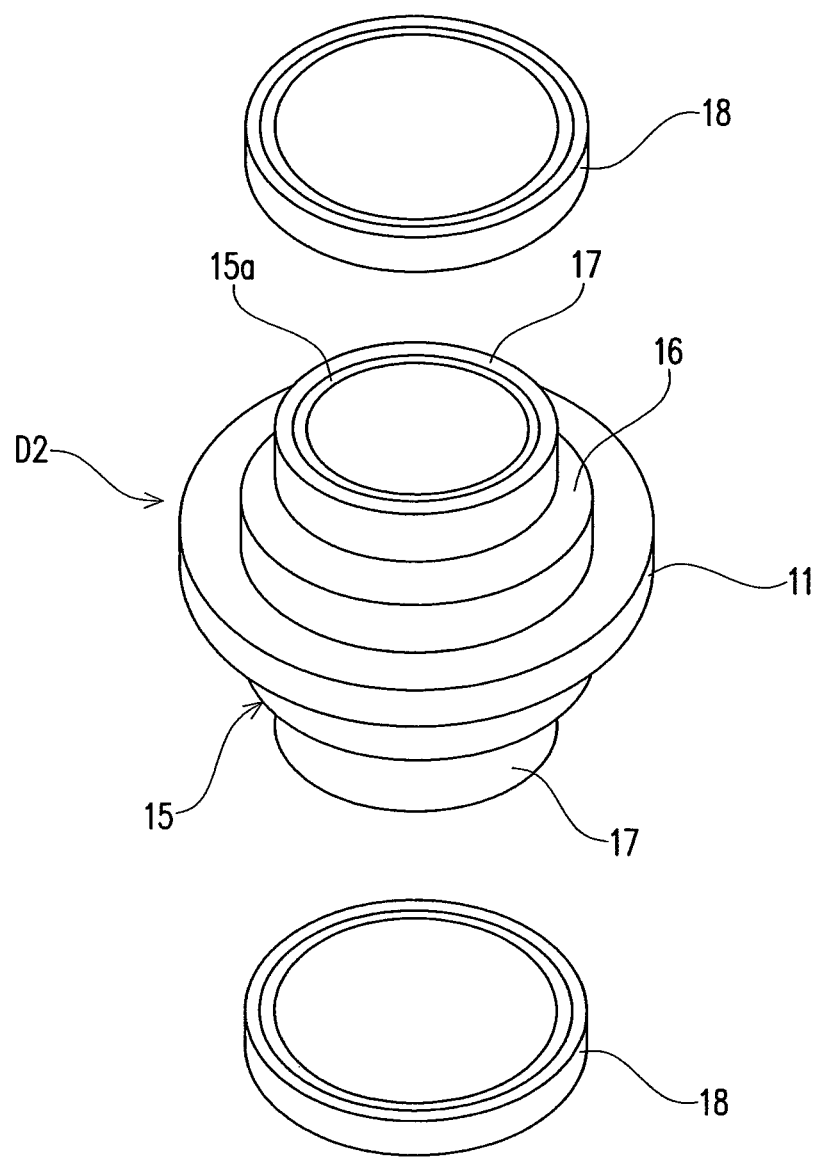
FIG. 6 is an exploded perspective view of a second assembly of the lifting and lowering mechanism.

Now a description is given of a manner in which the height adjustable suspension unit is used, by referring to FIGS. 1 and 2. FIG. 1 illustrates a state in which: power has not been transmitted to the worm 10; the gear mechanism A and the power conversion section B are not in operation; and the cylinder 1 is located at the lowered position, i.e., the movable part 6 of the cylinder 1 stays at the lowest position of the rails 26, 26. In this state, the chassis X is at a low ground clearance position.

When a need arises to run over a stepped portion, a driver turns on a switch (not shown) installed inside the vehicle while the height adjustable suspension unit is in the state of FIG. 1 so as to activate an electric motor to supply power to the worm 10. As the worm 10 rotates, the worm wheel 11 and the female screw 15 start rotating, allowing the male screw portion 5 of the cylinder 1 to move upward correspondingly (cf., FIG. 2), which means the chassis X moves upward. In this process, the coil spring 4 is pressed while its length is kept unchanged, and thus, the chassis X is lifted by the length corresponding to the length through which the cylinder 1 advanced. The rails 26, 26 of the guide section C ensure that the cylinder 1 is always kept upright during the upward movement, thereby enabling smooth lifting of the chassis X without distortion. In addition, even if the cylinder 1 is subjected to shocks from a road surface, the shock absorber absorbs the shocks by the extension and contraction of the extensible rod 2, which ensures that the ride quality is maintained even when driving on a rough road.

It is to be understood that the present invention is not limited to the above-described embodiments, but various modifications may be made thereto without departing from the spirit and scope of the invention.

Figure 9:
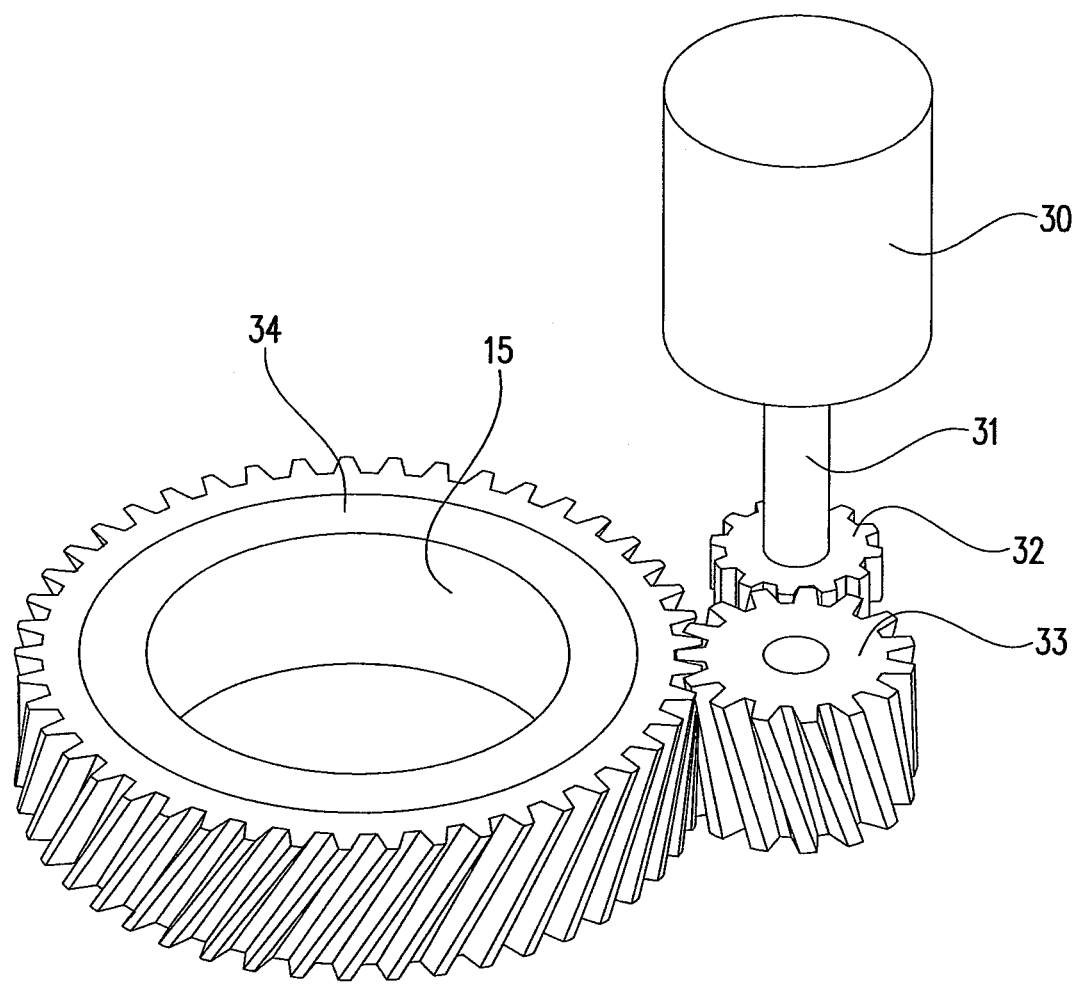
FIG. 9 illustrates a structure of a drive that is used when driving a worm with an electric motor.

In the above embodiment in which the worm 10 is driven by an electric motor, a helical gear and a wheel gear may be used, for example, so that the helical gear meshes with the wheel gear for driving. As shown in FIG. 9, an example of a height adjustable suspension unit with this structure includes: a drive gear 32 fixed to a rotating shaft 31 of a motor 30; a helical gear 33 that meshes with the drive gear 32; and a wheel gear 34 that meshes with the helical gear 33. The wheel gear 34 has a female screw 15 fixed to its inner circumferential surface to be threadedly engaged with the male screw portion 5.

The rotation of the rotating shaft 31 of the motor 30 causes the wheel gear 34 to rotate via the helical gear 33, thereby allowing the cylinder to be raised and lowered so that the chassis is lifted and lowered.

In the above embodiment, the worm 10 is driven by an electric motor, but alternatively it may be manually driven to rotate. In this case, it is to be noted that, while a vehicle is stopped, height adjustment is performed manually. An example of this type of height adjustable suspension unit is described with reference to FIG. 10 and FIGS. 11(a) and 11(b). In FIGS. 11(a) and 11(b), as viewed from the front, the left side is referred to as the first side, and the ride side is referred to as the second side.

This type of height adjustable suspension unit includes: a pair of bearing members 42, 42 for rotatably supporting the shaft portions 41 of the worm (transmission gear) 40 that meshes with the worm wheel (wheel gear) 110; a pair of locking pieces 43, 43 that project from the end portion of the second shaft portion 41 to be orthogonal to the axis of the end portion; a receiving member 45 having a hollow portion 45a where the second shaft portion 41 is inserted and removed; a spring 47 (a leaf spring or a coil spring) disposed between the second bearing 42 and the receiving member 45; a pair of supports 480 and 481 into which the two shaft portions are each inserted to be rotatably supported, the supports 480 and 481 being mounted to a mounting body (e.g., a case); and a manual operation handle 49 that is detachably attached to the second shaft portion 41. A female screw 15 is fixed to the inner circumferential surface of the worm wheel 110 to be threadedly engaged with a male screw portion 5 of a cylinder 1. The worm 40, which meshes with the worm wheel 110, is slightly movable in the axial direction.

The second shaft portion 41 of the worm 40 has, at its end portion, a fitting recess 41a (connection portion) that is axially recessed from the end surface of the end portion. A fitting projection 49a of the later-described manual operation handle 49 is fitted into the fitting recess 41a.

The receiving member 45 is of a cylindrical shape and has the above-described hollow portion 45a. The receiving member 45 has on the outer circumferential surface of the one end portion: a spring receiving portion (projecting portion) 44 having an outer diameter that is larger than the inner diameter of the support 481 and smaller than the outer diameter of the support 481; and a pair of grooves 46, 46 into which the locking pieces 43, 43 of the worm 40 are inserted, the pair of grooves 46, 46 being formed axially on inner peripheral surfaces of the hollow portion 45a.

The inner diameter of the spring 47 is smaller than the straight line between the end portions of the two locking pieces 43, 43. As such, the spring 47 may be compressed between the second bearing member 42 and the spring receiving portion 44.

The supports 480, 481 have thread grooves 48a on their outer circumferential surfaces to be threadedly engaged with holes of a mounting body (e.g., a case) and secured thereto (not shown). The first support 480 has: a tubular portion 480a into which the first shaft portion 41 is inserted; and an annular portion 480b with the thread grooves 48a formed on its outer circumferential surface. The second support 481 has an annular shape, and the second shaft portion 41 is inserted into the second support 481. In the first support 480, the first bearing member 42 is in contact with an end surface of the tubular portion 480a. The first bearing member 42 is located away from the worm 40 so that the worm 40 is movable along the axial direction. The second bearing member 42 is biased by the spring 47 into contact with an end surface of the worm 40. The spring receiving portion 44 of the receiving member 45 is press-contacted with an end surface of the second support 481 by the spring 47.

Figure 10:
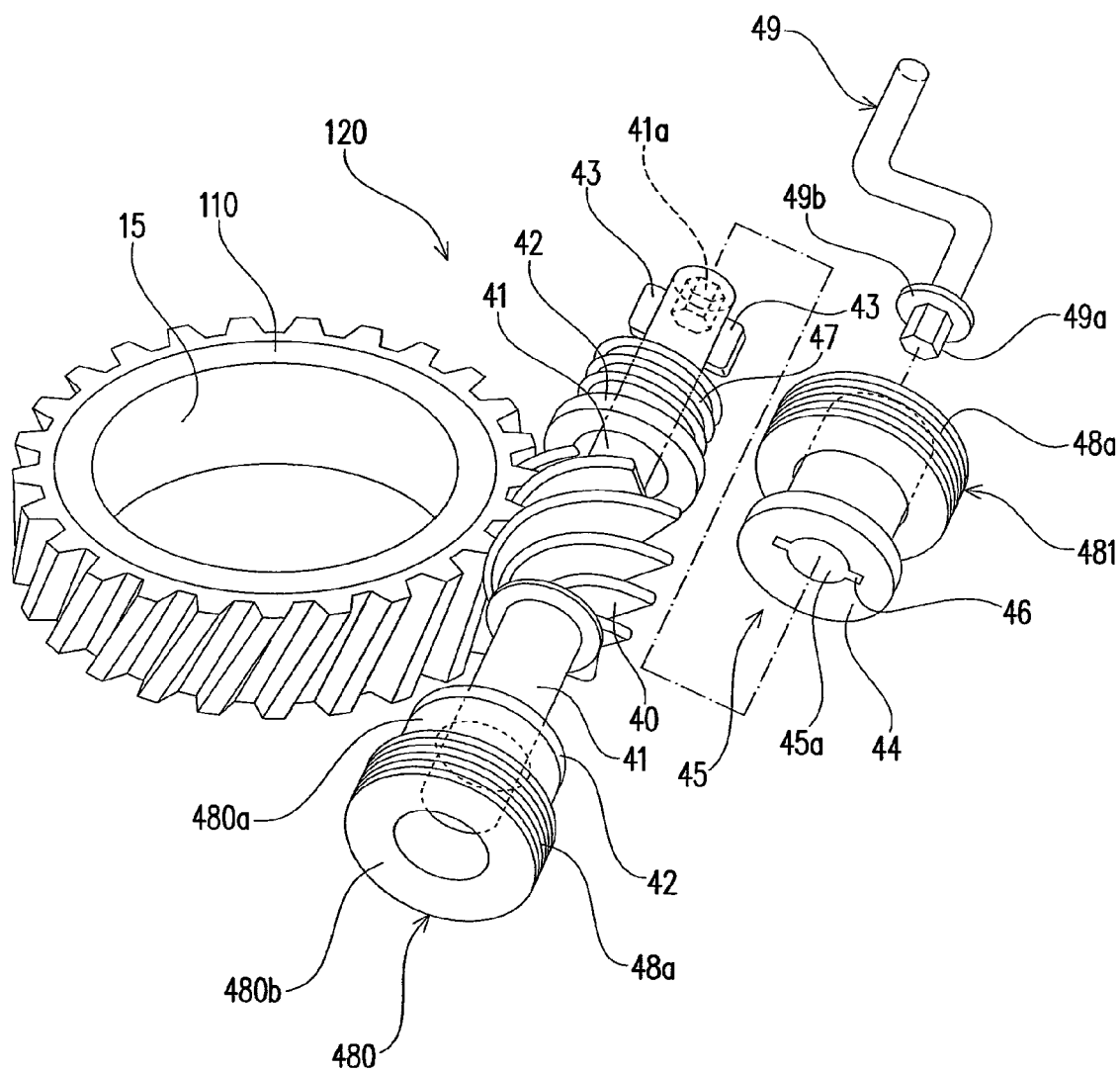
FIG. 10 illustrates a structure of a drive that is used when driving a worm manually.
Figure 11A:
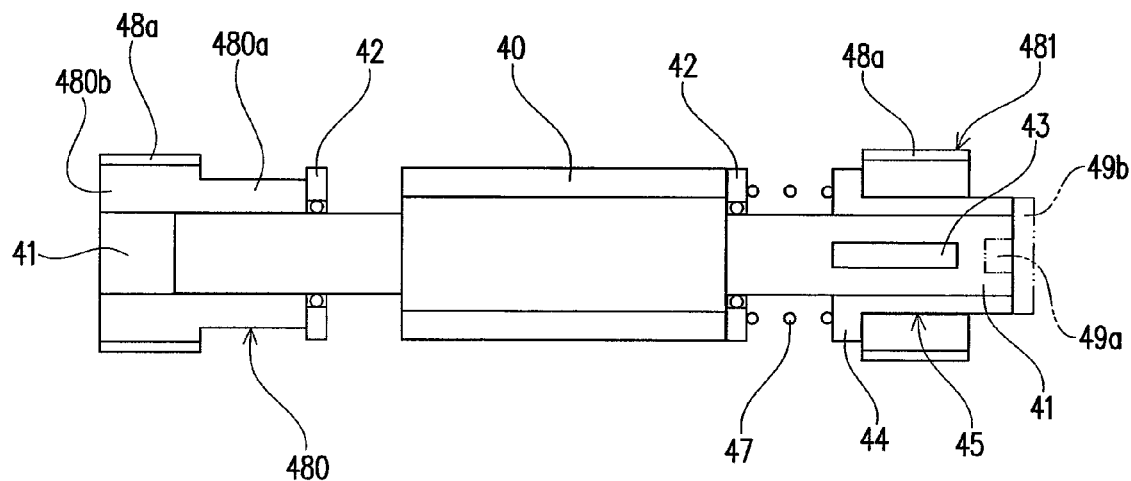
FIG. 11(a) illustrates a state in which a projecting portion of a transmission gear is held in press-contact with a support.
Figure 11B:
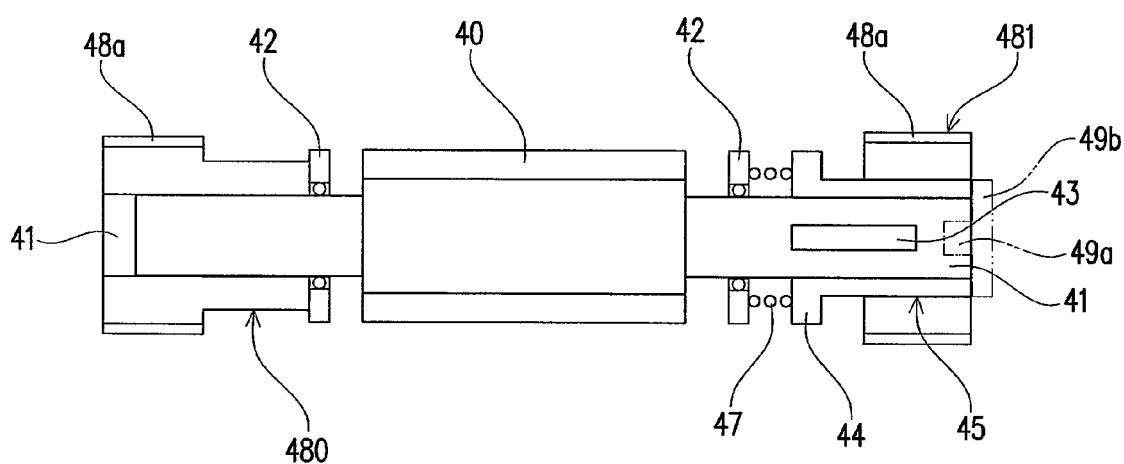
FIG. 11(b) illustrates a state in which the projecting portion of the transmission gear is released from the press-contact with the support with a manual operation handle, enabling rotational operation of the transmission gear.
Figure 12:
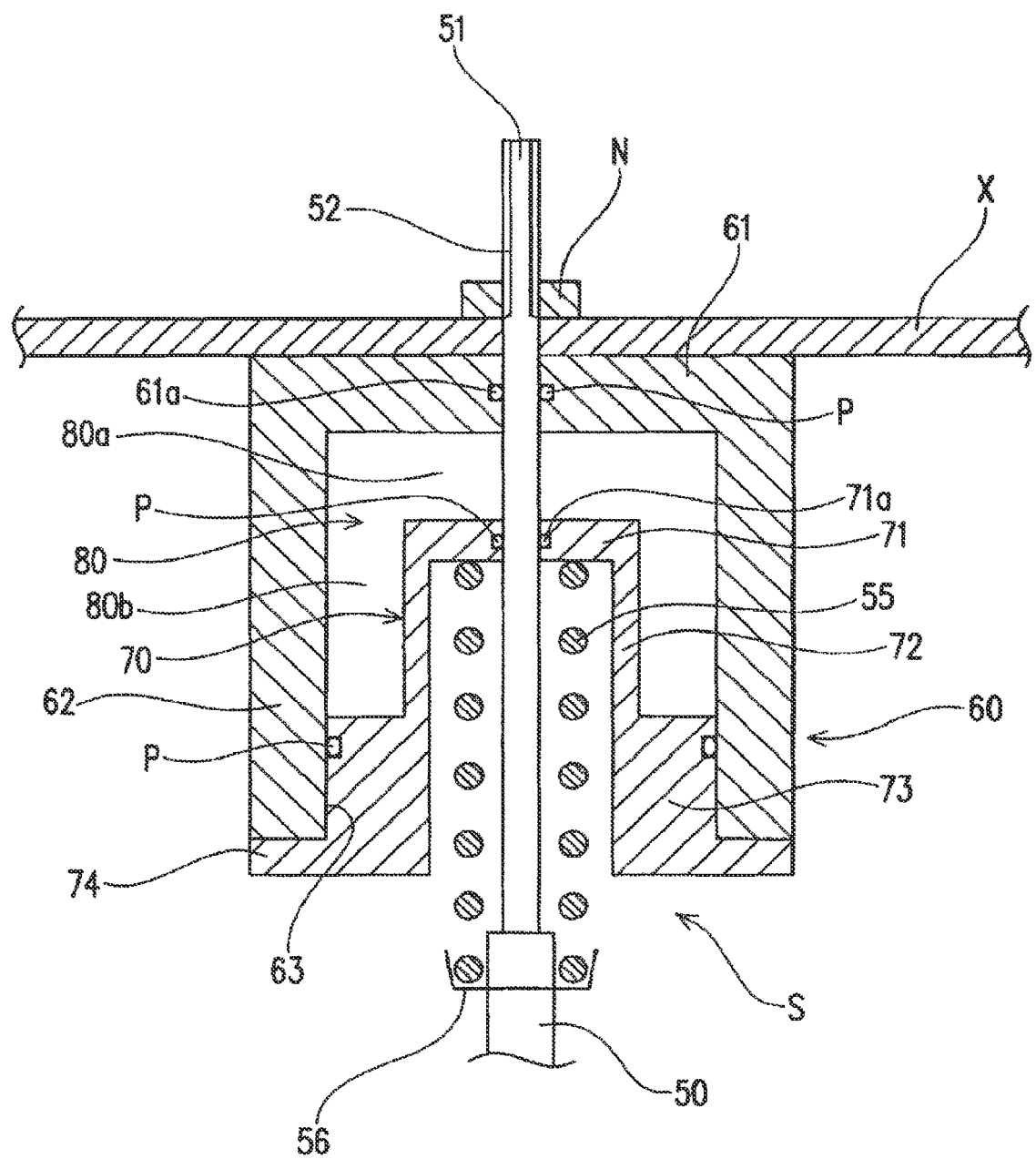
FIG. 12 is a cross sectional view of a conventional height adjustable suspension unit.
Figure 13:
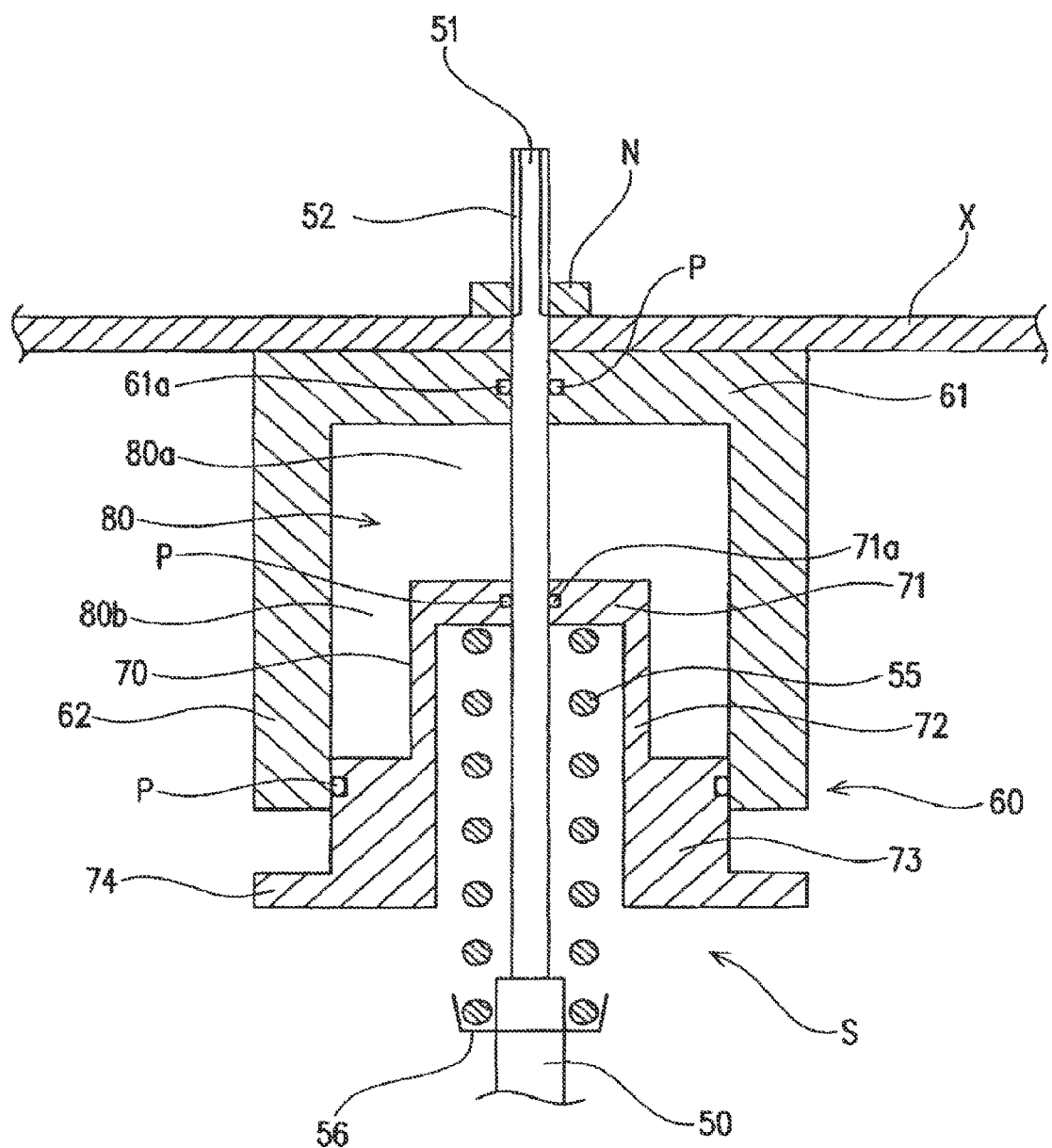
FIG. 13 is a cross sectional view illustrating a state in which a chassis has been lifted after supply of a fluid into the height adjustable suspension unit of FIG. 12.

As shown in FIG. 10, the manual operation handle 49 has the fitting projection 49a that projects from the end surface of the end portion along the axial direction; and an annular pressing portion 49b disposed on the circumference of the fitting projection 49a.

In FIG. 11(a), the supports 480, 481 and the pair of bearing members 42, 42 are mounted to the mounting body (e.g., a case). The shaft portions 41, 41 of the worm 40 are each inserted into and rotatably supported by the bearing members 42, 42 and the supports 480, 481. More specifically, the spring 47 is mounted around the second shaft portion 41 of the worm 40, and the receiving member 45 is inserted into and rotatably supported by the second support 481 while the locking pieces 43, 43 of the second shaft portion 41 are inserted into the grooves 46, 46 of the receiving member 45. In this state, the spring 47 disposed between the second bearing member 42 and the receiving member 45 is in a compressed state, and the biasing force of the spring 47 causes the spring receiving portion 44 of the receiving member 45 to be biased toward the second support 481. Thus, the end surface of the spring receiving portion 44 is press-contacted with the end surface of the support 481, disabling the operation of manually rotating the shaft portions 41, 41 of the worm 40. That is, the receiving member 45 is in a locked state, so that the shaft portions 41, 41 of the worm 40 cannot be rotated.

In the state of FIG. 11(a), the fitting projection 49a of the manual operation handle 49 is fitted into the fitting recess 41a of the second shaft portion 41, and the pressing portion 49b of the manual operation handle 49 is brought into contact with the opening end surface of the receiving member 45. In this state, the receiving member 45 and the second shaft portion 41 are pressed toward the first end portion against the biasing force of the spring 47. Then, as shown in FIG. 11(b), the end surface of the spring receiving portion 44 is slightly moved away from the end surface of the second support 481, the worm 40 is slightly moved away from the second bearing member 42, and the first bearing member 42 of the worm 40 slightly moves toward the opening end portion of the first support 480. The receiving member 45 is thus released from the locking engagement with the second support 481, enabling manual operation of the shaft portions 41, 41 of the worm 40.

When the manual operation handle 49 is manually turned in this state, the shaft portions 41, 41 of the worm 40 start rotating correspondingly, allowing the cylinder to be raised and lowered and thus enabling adjustment of vehicle height.

In any of the above-described embodiments, height adjustment is carried out according to a driver's determination. The height adjustable suspension unit of the present invention is applicable in either case, when driving on a rough road with bumps or when driving on a flat asphalt paved road.

Description Of Reference Codes 1, 50: cylinder, 2, 51: extensible rod 51, 3, 56: spring base, 4, 55: coil spring, 5: male screw, 6: movable part, 6a: recess, 10, 40: worm (transmission gear), 10a: shaft portion, 11, 34, 110: worm wheel (wheel gear), 12: worm gear, 12a: shaft portion, 13: bearing, 15a: thread, 16: tubular portion, 17: annular shaft portion, 18: bearing, 20: case, 20a: lower case body, 20b: upper case body, 21: cylinder insertion hole, 22: bolt insertion hole, 23: fitting hole, 25: tubular body, 26: rail, 27: flange, 27a: attachment hole, 30: motor, 31: rotating shaft, 32: drive gear, 33: helical gear (transmission gear), 41: shaft portion, 41a: fitting recess (connection portion), 42: bearing member, 43: locking piece, 44: spring receiving portion, 45a: hollow portion, 45 receiving member, 46: groove, 47: spring, 480, 481: support, 48a: thread groove, 480a: tubular portion, 480b: annular portion, 49: manual operation handle, 49a: fitting projection, 49b: pressing portion, A: gear mechanism, B: power conversion section, C: guide section, C1: guide section assembly, D: lifting and lowering mechanism, D1: first assembly of the lifting and lowering mechanism, D2: second assembly of the lifting and lowering mechanism, N: nut, P: packing, S: shock absorber, X: chassis, 52: screw portion, 60: cylinder, 61: contact portion, 61a: groove, 62: covering portion, 63: lower end opening, 70: plunger, 71: rod-side sliding portion, 71a: groove, 72: covering portion, 73: cylinder-side sliding portion, 74: stopper, 80: fluid pressure chamber, 80a: upper space, 80b: tubular lateral side space, R: reciprocal movement passage, Ra: fluid pressure chamber

The invention claimed is:

1. A height adjustable suspension unit comprising:
a shock absorber having a cylinder and an extensible rod disposed in the cylinder to be able to advance and retract, the extensible rod having an end portion that is coupled to a chassis;
a coil spring and mounted around the extensible rod, the coil spring having a lower end supported on a spring base that is attached to the upper end of the cylinder;
a lifting and lowering mechanism including:
  a gear mechanism;
  a power conversion section that converts power transmitted from the gear mechanism into power move the cylinder up and down; and
  a guide section that guides the up and down movement of the cylinder;
  the gear mechanism including:
    a worm having:
      shaft portions provided at both ends of the worm;
      a connection portion that is provided at one end of one of the shaft portions for connection with a manual operation handle; and
      a projecting portion that is mounted on an end portion close to the one end of the one of the shaft portions the project portion projecting orthogonal to the axis of the one of the shaft portions; and
    a wheel gear that meshes with the worm, the wheel gear being, mounted on the cylinder at such a location as to provide a stroke length;
  a support that rotatably supports one end of one of the shaft portions of the worm; and
  a presser member that is provided for bringing an end surface of the projecting portion into press-contact with the end surface of the support to such an extent as to allow the projecting portion to he released from the press-contact with the support by manual pressing.

2. The height adjustable suspension unit according to claim 1, wherein the power conversion section comprises:
- a female screw fixed to the inner circumferential surface of the wheel; and
- a male screw portion that is threadedly engaged with the female screw, the male screw portion being formed on the outer circumferential surface of the cylinder.

3. The height adjustable suspension unit according to claim 1, wherein the guide section comprises:
- rails disposed below the power conversion section along the axial direction; and
- a movable part mounted at a lower end of the cylinder to be movable along the rails.

4. The height adjustable suspension unit according to claim 1, wherein the worm meshes with the wheel gear to such a degree as to be slightly movable along the axial direction of the worm.

5. The height adjustable suspension unit according to claim 1, wherein the worm further comprises:
- a locking piece that projects from the one end portion of the one of the shaft portions in a direction orthogonal to the axis of the one end portion;
- a receiving member through which the one end potion of the one of the shaft portions is inserted;
- the projecting portion which is formed on an outer circumferential surface of the receiving member; and
- the receiving member having an inner peripheral surface that defines a groove into which the locking piece is inserted.

6. The height adjustable suspension unit according to claim 4, wherein the worm further comprises:
- a locking piece that projects from the one end portion of the one of the shaft portions in a direction orthogonal to the axis of the one end portion;
- a receiving member through which the one end potion of the one of the shaft portions is inserted;
- the projecting portion which is formed on an outer circumferential surface of the receiving member; and
- the receiving member having an inner peripheral surface that defines a groove into which the locking piece is inserted.

* * * * *

UNITED STATES PATENT AND TRADEMARK OFFICE
CERTIFICATE OF CORRECTION

PATENT NO. : 8,616,352 B2
APPLICATION NO. : 13/129086
DATED : December 31, 2013
INVENTOR(S) : Hideyuki Hinouchi It is certified that error appears in the above-identified patent and that said Letters Patent is hereby corrected as shown below:

Title Page, Assignee Data, Item (73), replace "ACC, Inc." with --ACC Inc.--

Signed and Sealed this
Twenty-fifth Day of March, 2014

Michelle K. Lee
*Deputy Director of the United States Patent and Trademark Office*